United States Patent
Figgins

(10) Patent No.: US 7,975,462 B1
(45) Date of Patent: Jul. 12, 2011

(54) MODULAR FLOOR ASSEMBLY FOR A COMBINE HEADER

(75) Inventor: Ryan M. Figgins, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/779,500

(22) Filed: May 13, 2010

(51) Int. Cl.
*A01D 43/00* (2006.01)
(52) U.S. Cl. .......................................................... 56/181
(58) Field of Classification Search .................... 56/181, 56/158; 198/699, 731, 523
See application file for complete search history.

(56) References Cited

U.S. PATENT DOCUMENTS

| | | | |
|---|---|---|---|
| 855,519 A | 6/1907 | Maloney | |
| 1,862,101 A * | 6/1932 | Pax | 198/523 |
| 2,347,365 A * | 4/1944 | Paradise | 198/699 |
| 2,599,438 A | 6/1952 | Downing et al. | |
| 2,720,743 A | 10/1955 | Prather | |
| 3,866,400 A | 2/1975 | May | |
| 4,199,925 A | 4/1980 | Quick et al. | |
| 4,414,793 A | 11/1983 | Halls | |
| 4,441,307 A | 4/1984 | Enzmann | |
| 4,641,490 A * | 2/1987 | Wynn et al. | 56/10.2 E |
| 4,665,685 A | 5/1987 | Rupprecht | |
| 4,707,972 A | 11/1987 | Knepper | |
| 4,722,172 A | 2/1988 | Pearce | |
| 5,459,986 A * | 10/1995 | Talbot et al. | 56/181 |
| 6,351,931 B1 * | 3/2002 | Shearer | 56/181 |
| 7,412,816 B2 * | 8/2008 | Coers et al. | 56/208 |
| 7,478,521 B2 * | 1/2009 | Coers et al. | 56/208 |
| 7,827,773 B2 * | 11/2010 | Sauerwein et al. | 56/181 |
| 7,886,512 B2 * | 2/2011 | Lohrentz et al. | 56/181 |
| 2002/0129591 A1 * | 9/2002 | Patterson et al. | 56/158 |
| 2007/0193243 A1 * | 8/2007 | Schmidt et al. | 56/181 |
| 2007/0204589 A1 * | 9/2007 | Coers et al. | 56/208 |
| 2008/0092508 A1 * | 4/2008 | Talbot et al. | 56/181 |
| 2008/0271426 A1 * | 11/2008 | Lohrentz et al. | 56/153 |
| 2009/0007533 A1 * | 1/2009 | Lovett et al. | 56/14.5 |
| 2009/0084080 A1 * | 4/2009 | Coers et al. | 56/15.8 |
| 2009/0266044 A1 * | 10/2009 | Coers et al. | 56/208 |
| 2009/0288383 A1 * | 11/2009 | Sauerwein et al. | 56/181 |
| 2010/0043373 A1 * | 2/2010 | Lohrentz et al. | 56/181 |
| 2010/0269472 A1 * | 10/2010 | Coers et al. | 56/15.8 |
| 2010/0313540 A1 * | 12/2010 | Sauerwein et al. | 56/181 |

* cited by examiner

*Primary Examiner* — Árpád Fábián-Kovács
(74) *Attorney, Agent, or Firm* — Michael G. Harms; Patrick M. Sheldrake

(57) ABSTRACT

An exemplary floor module suitable for inclusion in the modular floor assembly comprises a support and an overlaying floor sheet. The support includes a support leading edge portion, a support trailing edge portion, and a floor support portion disposed therebetween. The support leading edge portion attaches to the cutter bar of a header. The support trailing edge portion includes a first resilient projection, and the floor support portion includes a second resilient projection. The floor sheet includes a floor sheet leading edge portion, a floor sheet trailing edge portion, and a substantially planar floor portion disposed therebetween. The first resilient projection and the floor sheet trailing edge portion define a trailing slot configured to receive a header frame projection. The second resilient projection and the substantially planar floor portion define a side slot configured to receive a side edge portion of an adjacent floor module.

20 Claims, 8 Drawing Sheets

US 7,975,462 B1

MODULAR FLOOR ASSEMBLY FOR A COMBINE HEADER

FIELD OF THE INVENTION

The present invention is primarily directed to a modular floor assembly for a header of a combine or other agricultural cutting machine.

BACKGROUND OF THE INVENTION

The floor of a header of a plant-cutting machine (e.g., combine) serves to provide a smooth transition for crop to flow from the cutterbar to the auger. Generally speaking, header floors are rather inflexible and, therefore, can significantly compromise header performance when the combine or other plant-cutting machine is operating on uneven terrain. This is because the header floor is attached to the cutterbar, and the relative inflexibility of the header floor limits the ability of the cutterbar to flex to match the underlying terrain. Moreover, header floors can be difficult to maintain because a significant portion of the header (e.g., cutterbar) usually must at least be partially disassembled to effect a repair. Such disassembly is labor-intensive and time-intensive, leading to significant maintenance costs and to lengthy interruptions of harvesting operations. Accordingly, what is sought is a header floor that allows the cutterbar of the header to flex more easily in order to improve header performance on uneven terrain. Additionally, what is sought is a header floor that does not require the disassembly of a significant portion of the header to effect a repair or replacement of the header floor or a section thereof.

SUMMARY OF THE INVENTION

In accordance with one aspect of the present invention, a floor module is disclosed that comprises a support and a floor sheet overlaying the support. The support comprises a support leading edge portion, a support trailing edge portion, and a floor support portion disposed between the support leading edge portion and the support trailing edge portion. The support leading edge portion comprises a cutter bar attachment portion configured for attachment to a cutter bar of a header. The cutter bar attachment portion terminates at a support leading edge. The support trailing edge portion comprises a first resilient projection, which terminates at a support trailing edge. The floor support portion comprises a second resilient projection that projects along an axis substantially parallel to an edge selected from the group consisting of the support leading edge and the support trailing edge.

The floor sheet, which overlays the support, comprises a floor sheet leading edge portion, a floor sheet trailing edge portion, and a substantially planar floor portion disposed between the floor sheet leading edge portion and the floor sheet trailing edge portion. The floor sheet leading edge portion is attached to the support leading edge portion of the support. The substantially planar floor portion is attached to the floor support portion of the support. The first resilient projection and the floor sheet trailing edge portion define a trailing slot configured to receive a frame projection of a header. The second resilient projection and the substantially planar floor portion define a side slot configured to receive a side edge portion of a substantially planar floor portion of an adjacent floor module.

In accordance with another aspect of the present invention, an array of partially-overlapping floor modules is disclosed. The array comprises a first floor module and an adjoining floor module. The first floor module includes a support and a floor sheet overlaying the support. The support comprises a support leading edge portion, a support trailing edge portion, and a floor support portion disposed between the support leading edge portion and the support trailing edge portion. The support leading edge portion comprises a cutter bar attachment portion configured for attachment to a cutter bar of a header. The cutter bar attachment portion terminates at a support leading edge. The support trailing edge portion comprises a first resilient projection, which terminates at a support trailing edge. The floor support portion comprises a second resilient projection that projects along an axis substantially parallel to an edge selected from the group consisting of the support leading edge and the support trailing edge.

The floor sheet, which overlays the support, comprises a floor sheet leading edge portion, a floor sheet trailing edge portion, and a substantially planar floor portion disposed between the floor sheet leading edge portion and the floor sheet trailing edge portion. The floor sheet leading edge portion is attached to the support leading edge portion of the support. The substantially planar floor portion is attached to the floor support portion of the support. The adjoining floor module comprises a side edge portion.

The first resilient projection and the floor sheet trailing edge portion define a trailing slot configured to receive a frame projection of a header. The second resilient projection and the substantially planar floor portion define a side slot. The side edge portion of the adjoining floor module is received in the side slot of the first floor module and is overlapped by the floor sheet of the first floor module.

In accordance with still another aspect of the present invention, a header is disclosed. The header comprises (1) a frame comprising a frame projection, (2) a cutter bar, and (3) a floor comprising an array of partially-overlapping floor modules. The array of partially-overlapping floor modules includes a first floor module and an adjoining floor module. The first floor module includes a support and a floor sheet overlaying the support. The support comprises a support leading edge portion, a support trailing edge portion, and a floor support portion disposed between the support leading edge portion and the support trailing edge portion. The support leading edge portion comprises a cutter bar attachment portion that is attached to the cutter bar. The cutter bar attachment portion terminates at a support leading edge. The support trailing edge portion comprises a first resilient projection, which terminates at a support trailing edge. The floor support portion comprises a second resilient projection that projects along an axis substantially parallel to an edge selected from the group consisting of the support leading edge and the support trailing edge.

The floor sheet, which overlays the support, comprises a floor sheet leading edge portion, a floor sheet trailing edge portion, and a substantially planar floor portion disposed between the floor sheet leading edge portion and the floor sheet trailing edge portion. The floor sheet leading edge portion is attached to the support leading edge portion of the support. The substantially planar floor portion is attached to the floor support portion of the support. The adjoining floor module comprises a side edge portion. The frame projection is received in a trailing slot defined by the first resilient projection and the floor sheet trailing edge portion. The side edge portion of the adjoining floor module is received in a side slot defined by the second resilient projection and the substantially planar floor portion. The side edge portion is overlapped by the floor sheet of the first floor module.

An advantage of the disclosed modular floor assembly is that the presence of multiple floor modules arranged laterally in an array allows the cutterbar of the header to flex more easily, enhancing header performance on uneven terrain.

Another advantage of the disclosed modular floor assembly is that although floor modules will generally shift relative to one another during operation of the header, the partial overlap feature of the modular floor assembly prevents this shifting from resulting in floor gaps, which can disrupt the flow of crop material and/or result in loss of crop material.

Still another advantage of the disclosed modular floor assembly is that when a floor module is damaged, a significant portion of the header does not have to be disassembled to effect a repair or replacement, reducing interruption of harvesting operations.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

A combine, which is a well-known agricultural cutting machine, includes a header configured to cut or sever crops, including (without limitation) small grains (e.g., wheat, soybeans), and to induct the cut or severed crops into a feeder. Both functions can be performed as the combine moves forward over a crop field. The header is attached to the forward end of the combine and includes a floor that is supported in desired proximity to the surface of a crop field. The present invention concerns the floor of the header, and FIGS. 1 and 2 show a header 10 comprising the modular floor assembly 20 of the present invention.

Figure 1:
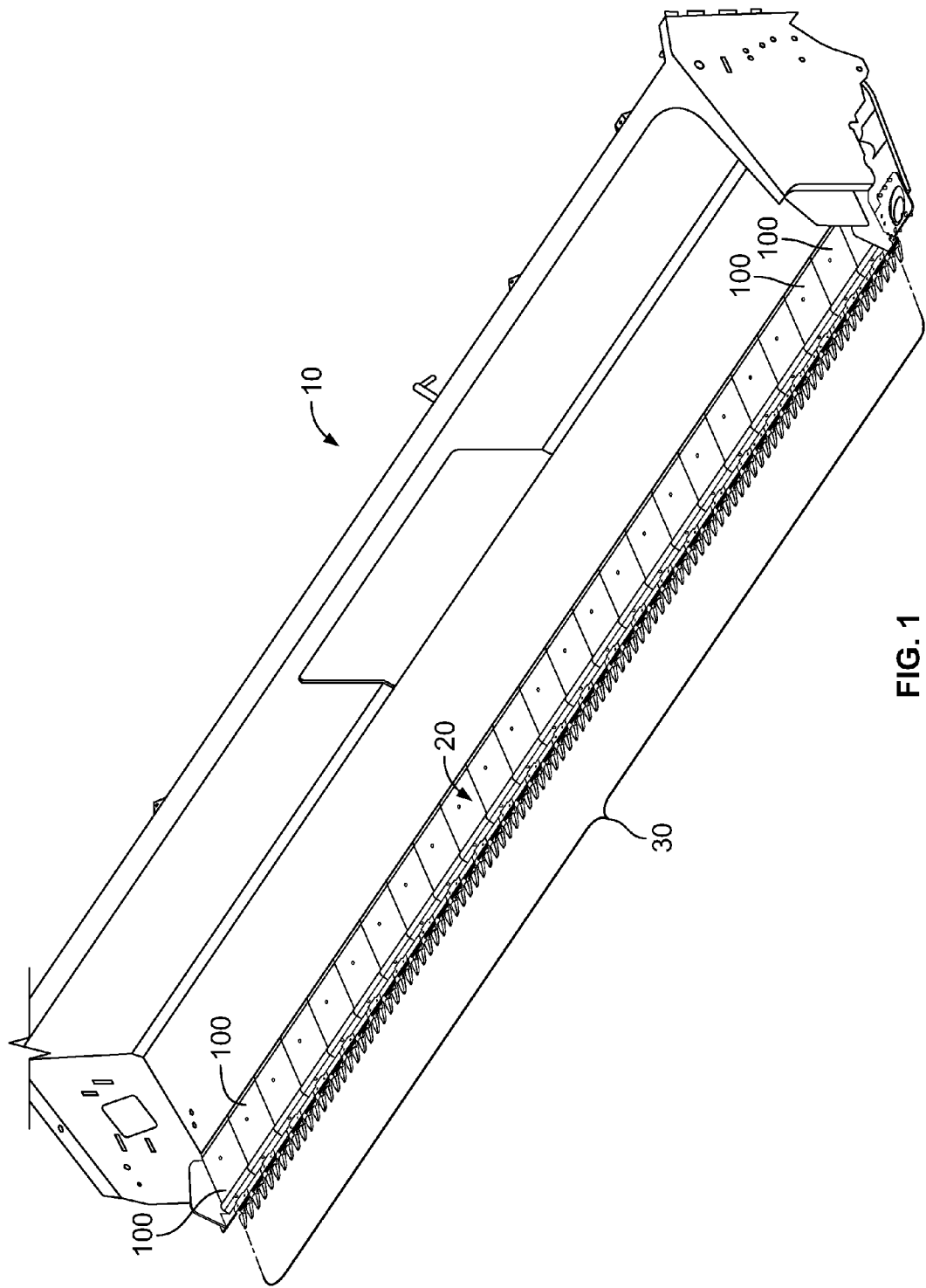
FIG. 1 is a perspective view of a header having an exemplary embodiment of the modular floor assembly installed thereon.
Figure 2:
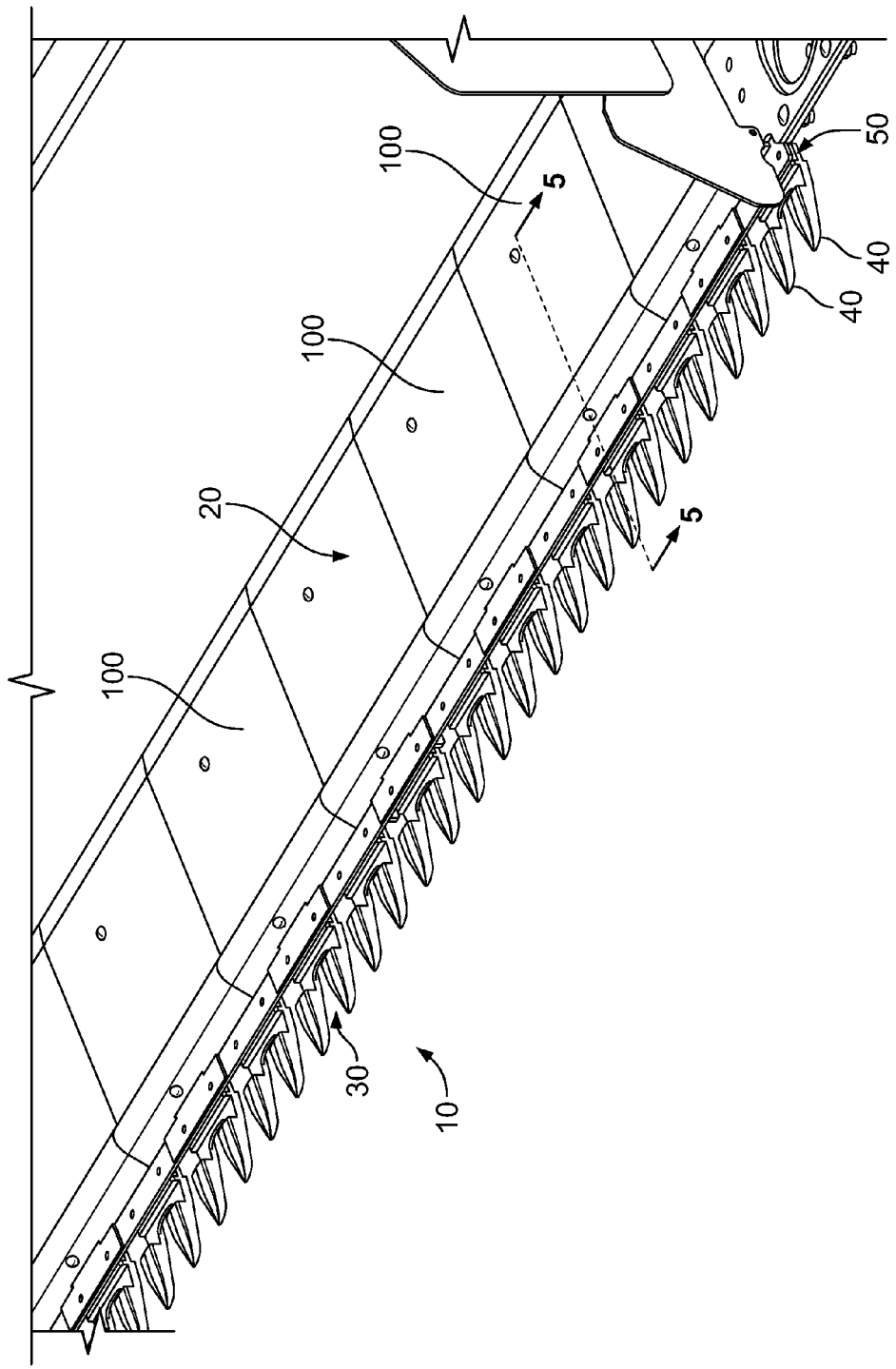
FIG. 2 is an enlarged partial view, in perspective, of the header shown in FIG. 1.

Many conventional features of header 10 are omitted from FIGS. 1 and 2 to permit an unobstructed view of modular floor assembly 20. In the interest of clarity, however, some of the major conventional features that are not shown in FIGS. 1 and 2 are summarized below, along with features that are shown. Similar to conventional headers, header 10 includes an elongate sidewardly extending sickle 30 configured to cut or sever crops in preparation for induction into a feeder (not shown). Header 10 can include an elongate, sidewardly extending reel (not shown) disposed above sickle 30. The reel is rotatable in a direction suitable for facilitating the induction of cut or severed crops into the feeder. Header can include an elongate, rotatable auger (not shown), which extends in close proximity to modular floor assembly 20 and has helical flights therearound. The auger is configured to cooperate with the reel in conveying cut or severed crops to the feeder, which is configured to convey the cut or severed crops into the combine for threshing and cleaning. Alternatively, instead of a rotatable auger, header 10 can include a draper head or other crop harvesting/gathering head. Referring to FIG. 2, stationary guards 40 project forward from a stationary cutter bar 50 and provide protection for the blades (not shown). Each stationary guard 40 is attached to a cutter bar 50 by a fastener (not shown). Stationary guards 40, which are spaced equally along cutter bar 50, guide crops toward sickle 30 for cutting or severing as the combine moves forward over a crop field. During operation, sickle 30 reciprocates rapidly to effect a cutting or severing action that cuts or severs plant stems, stalks or other material present between blades (not shown). Modular floor assembly 20 includes a plurality of floor modules 100, which are described hereinafter and shown in greater detail in FIGS. 3-8.

Figure 3:
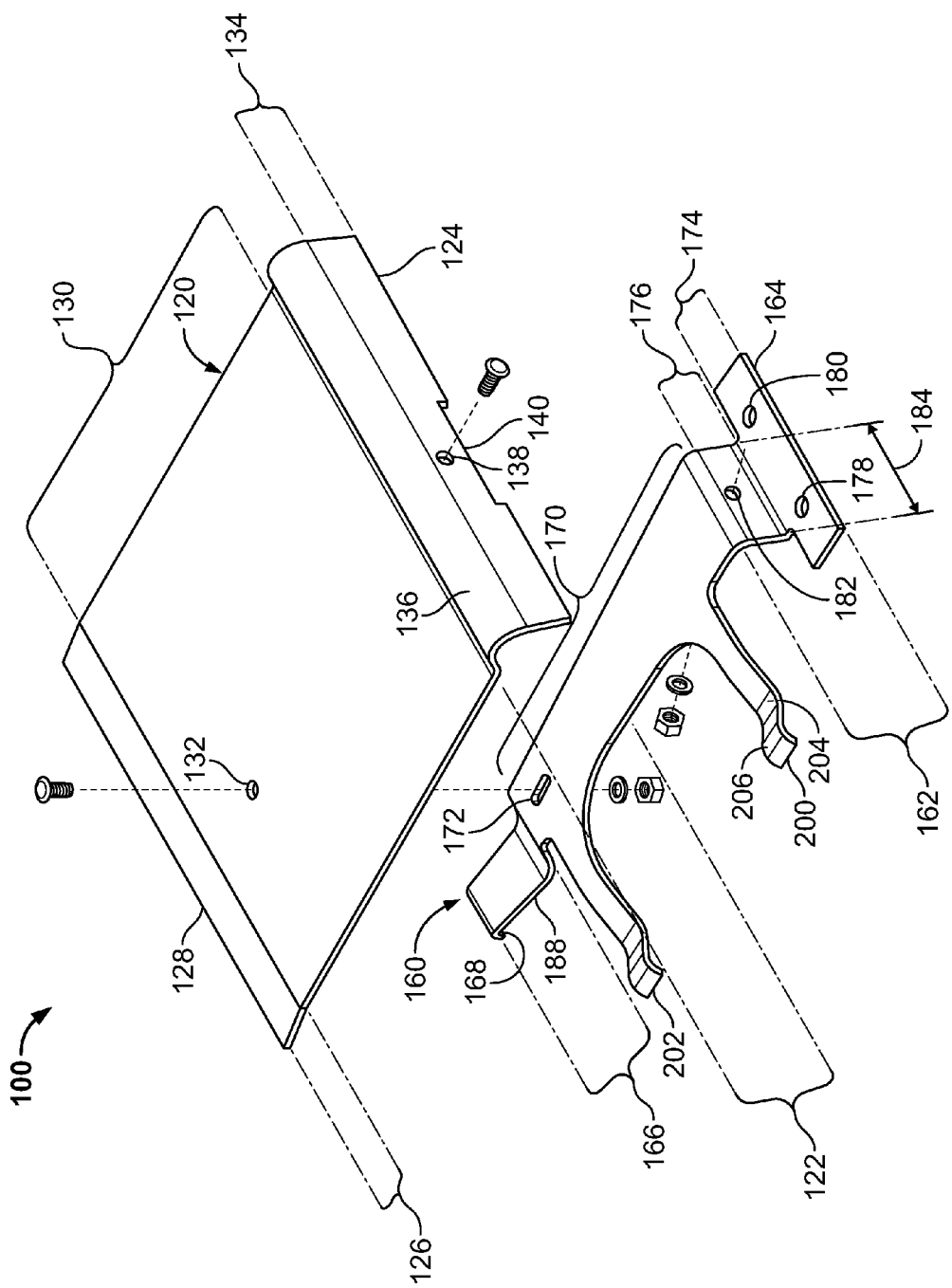
FIG. 3 is an exploded view, in perspective, of an exemplary embodiment of a floor module suitable for use in the modular floor assembly.

FIG. 3 is an exploded view of a floor module 100 of the modular floor assembly 20 for a header. Floor module 100 includes a floor sheet 120 that overlays a floor support 160. Floor sheet 120 includes a floor sheet leading edge portion 122 that terminates at a floor sheet leading edge 124, and includes a floor sheet trailing edge portion 126 that terminates at a floor sheet trailing edge 128. Floor sheet leading edge 124 and floor sheet trailing edge 128 are substantially parallel. Additionally, floor sheet 120 includes a floor portion 130 interposed between floor sheet leading edge portion 122 and floor sheet trailing edge portion 126. As shown in FIG. 3, floor portion 130 can be substantially planar. Floor portion 130 includes a first floor sheet aperture 132.

Figure 4:
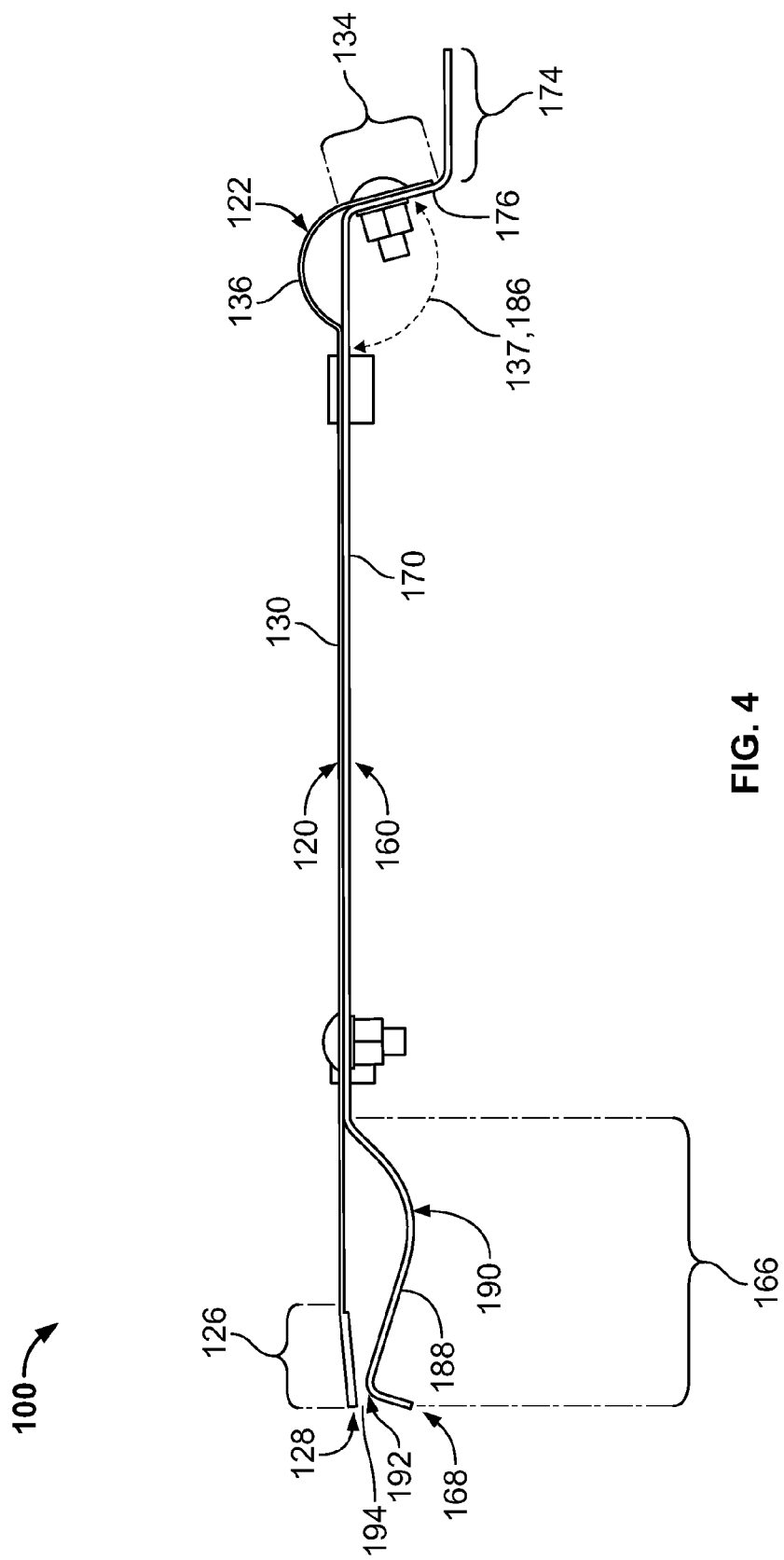
FIG. 4 is a side view of the exemplary embodiment of the floor module shown in FIG. 3.

Floor sheet trailing edge portion 126 is configured to contact a leading projection 196 (see FIG. 5) of the frame 198 (see FIG. 5) of header 10. As evidenced by FIGS. 3 and 4, floor sheet trailing edge portion 126 and floor portion 130 do not have to be coplanar. Preferably, floor sheet trailing edge portion 126 and floor portion 130 are not coplanar, with floor sheet trailing edge portion 126 being angled toward floor support 160. Floor sheet leading edge portion 122 terminates at a first terminal portion 134, which includes floor sheet leading edge 124. First terminal portion 134 is angled toward floor support 160. As shown in FIG. 4, the angle 137 between first terminal portion 134 and floor portion 130 is preferably between approximately 90 degrees and approximately 125 degrees, rendering it nearly perpendicular to the plane defined by floor portion 130. Optionally, and as shown in FIGS. 3 and 4, floor sheet leading edge portion 122 includes an elevated portion 136 interposed between floor portion 130 and first terminal portion 134. Elevated portion 136 protrudes away from floor support 160. First terminal portion 134 includes a second floor sheet aperture 138. Optionally, and as shown in FIG. 3, floor sheet leading edge 124 can include an edge depression 140 proximate second floor sheet aperture 138.

Floor support 160 includes a floor support leading edge portion 162 that terminates at a floor support leading edge 164, and includes a floor support trailing edge portion 166 that terminates at a floor support trailing edge 168. Floor support leading edge 164 and floor support trailing edge 168 are substantially parallel. Additionally, floor support 160 includes a floor support portion 170 interposed between floor support leading edge portion 162 and floor support trailing edge portion 166. As shown in FIG. 3, floor support portion 170 can be substantially planar. Floor support portion 170 includes a first floor support aperture 172, which is configured to be aligned with first floor sheet aperture 132 of floor sheet 120 to facilitate assembly of floor module 100.

Figure 5:
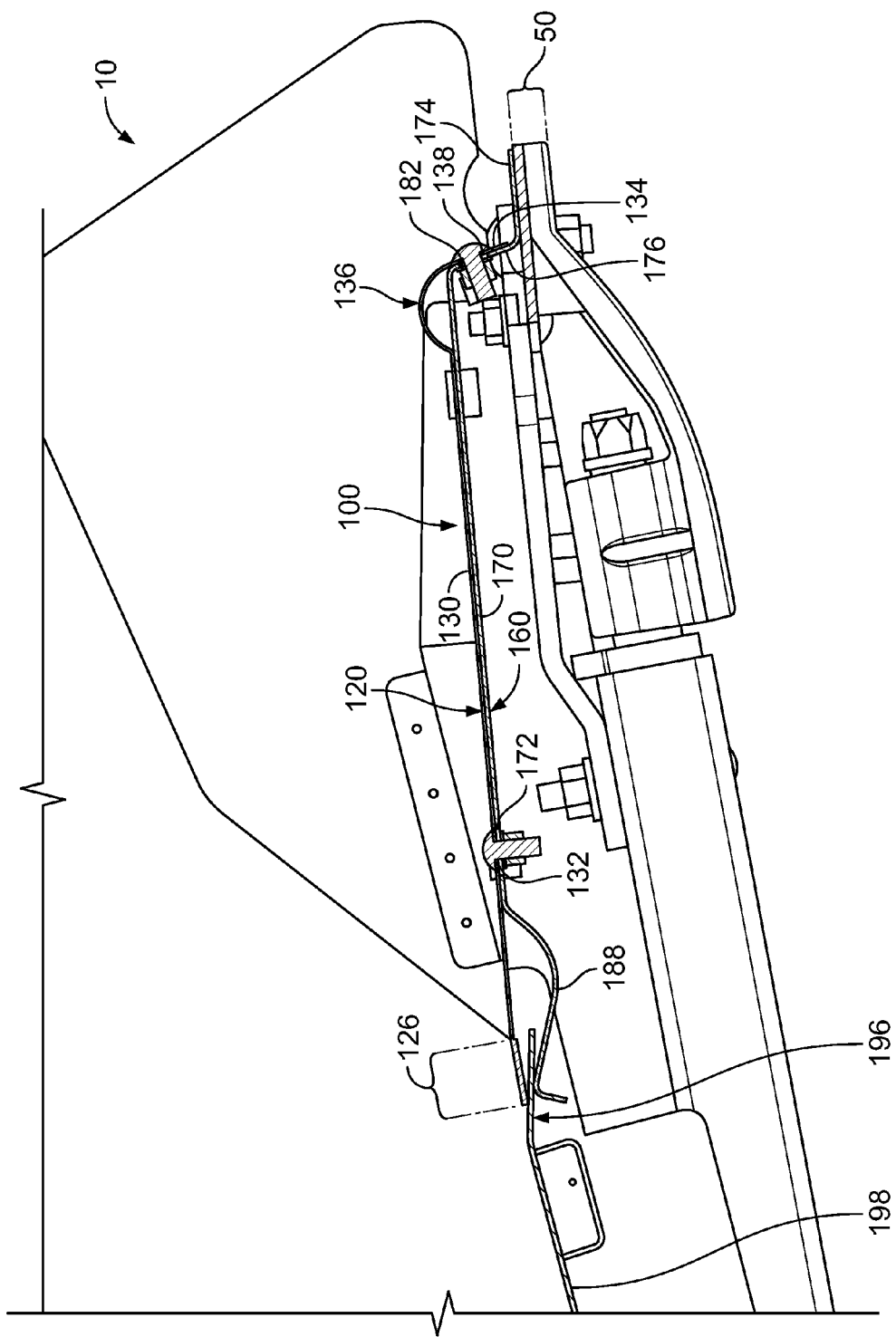
FIG. 5 is a side view in section taken along line 5-5 of FIG. 2 of the header having an exemplary embodiment of the modular floor assembly installed thereon, the modular floor assembly comprising the floor module shown in FIGS. 3 and 4.

Floor support leading edge portion 162 includes a cutter bar attachment portion 174 and a ramp portion 176. Cutter bar attachment portion 174, which terminates at floor support leading edge 164, includes a first cutter bar attachment aperture 178 and, optionally, a second cutter bar attachment aperture 180. First cutter bar attachment aperture 178 and (if applicable) second cutter bar attachment aperture 180 are configured to be aligned respectively with corresponding apertures of the cutter bar 50 of header 10, as shown collectively in FIGS. 2 and 5, thereby facilitating the attachment of floor support 160 to cutter bar 50 by fastener(s) (e.g., nuts and bolts), as shown in FIG. 5. Referring to FIGS. 3 and 4, the plane defined by cutter bar attachment portion 174 is preferably parallel or approximately parallel to the plane defined by floor support portion 170. Ramp portion 176 joins floor support portion 170 and cutter bar attachment portion 174, and includes a ramp aperture 182, which is configured to be aligned with second floor sheet aperture 138, thereby facilitating the attachment of floor support 160 to floor sheet 120 by fastener(s) (e.g., nuts and bolts). The width 184 of floor support leading edge portion 162 at the juncture of ramp portion 176 and cutter bar attachment portion 174 is preferably approximately equal (or slightly less than approximately equal) to the width of edge depression 140 of floor sheet 120, permitting edge depression 140 to overlay ramp portion 176 at the juncture. This overlaying fit assists in stabilizing the connections between floor sheet 120 and floor support portion 160 against lateral forces. As shown in FIG. 4, the angle 186 between ramp portion 176 and floor support portion 170 is preferably between approximately 90 degrees and approximately 125 degrees, rendering it nearly perpendicular to the plane defined by floor support portion 170. Even more preferably, angle 186 is equal to, or approximately equal to, angle 137, thus allowing ramp portion 176 to provide support for first terminal portion 134 of floor sheet 120.

Floor support trailing edge portion 166 comprises a first resilient projection 188 that terminates at floor support trailing edge 168. Optionally, and as shown in FIGS. 3 and 4, first resilient projection 188 can have an approximately "S"-shaped contour or other non-linear contour having a first surface 190 corresponding to a local minimum and a second surface 192 corresponding to a local maximum. It is worth noting that in an alternate embodiment where the contour of first resilient projection 188 is more pronounced than as shown in FIG. 4, first surface 190 can instead correspond to a global minimum. In another alternate embodiment, the contour of first resilient projection 188 can instead be arcuate and, therefore, have a local (or global) minimum without necessarily having a local maximum. In still another embodiment, the contour of first resilient projection 188 is not curvilinear. As shown in FIG. 4, when floor sheet 120 is properly secured to floor support 160, floor sheet trailing edge portion 126 and floor support trailing edge portion 166 define a trailing slot 194 that is configured to receive therein leading projection 196 of frame 198 of header 10 (see FIG. 5). Floor sheet 120, which includes floor sheet trailing edge portion 126, is formed of stainless steel or other resilient, durable material, and preferably is of unitary construction. Similarly, floor support 160, which includes first resilient projection 188, is formed of spring steel or other resilient, durable material, and preferably is of unitary construction. Thus, upon assembly of floor module 100, floor sheet trailing edge portion 126 and first resilient projection 188, in combination, function by clipping on to leading projection 196 of frame 198 upon insertion of leading projection into trailing slot 194. This clipping action assists in securing floor module 100 to leading projection 196 of header 10, as shown in FIG. 5.

Figure 6:
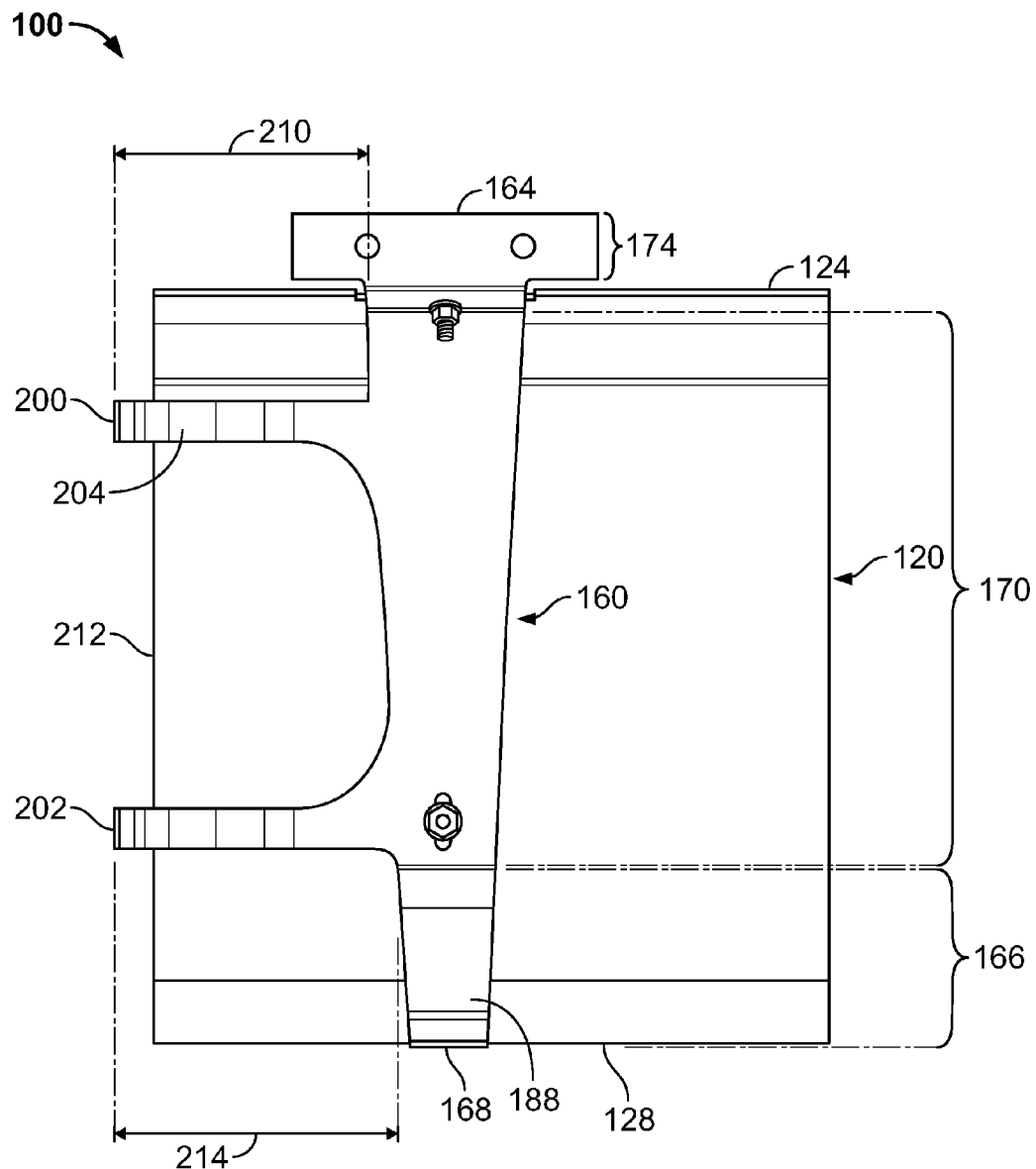
FIG. 6 is a bottom view of the exemplary embodiment of the floor module shown in FIG. 3.

As stated previously, floor support 160 includes floor support portion 170. Referring to FIG. 3, floor support portion 170 includes a second resilient projection 200. Optionally, and as shown in FIG. 3, floor support portion 170 can include a third resilient projection 202. Similar to first resilient projection 188, second resilient projection 200 can have an approximately "S"-shaped contour or other non-linear contour having a surface 204 (see FIGS. 3 and 6) corresponding to a local minimum and another surface 206 corresponding to a local maximum (see FIGS. 3 and 7). It is worth noting that in an alternate embodiment where the contour of second resilient projection 200 is more pronounced than as shown in FIG. 3, surface 204 can instead correspond to a global minimum. In another alternate embodiment, the contour of second resilient projection 200 can instead be arcuate and, therefore, have a local (or global) minimum without necessarily having a local maximum. In still another embodiment, the contour of second resilient projection 200 is not curvilinear. As shown in FIG. 3, third resilient projection 202 can be substantially identical to second resilient projection 200. Referring to FIGS. 3 and 6, second resilient projection 200 and third resilient projection 202 project sideways from floor support portion 170. In the embodiment shown in FIGS. 3 and 6, second resilient projection 200 projects along an axis that is substantially parallel to floor support leading edge 164 and/or floor support trailing edge 168. Additionally, second resilient projection 200 and floor support portion 170 are approximately coplanar. Similarly, third resilient projection 202 projects along an axis that is substantially parallel to floor support leading edge 164 and/or floor support trailing edge 168. Third resilient projection 202 and floor support portion 170 are approximately coplanar, as well, rendering second resilient projection 200 and third resilient projection 202 approximately coplanar to one another.

Figure 7:
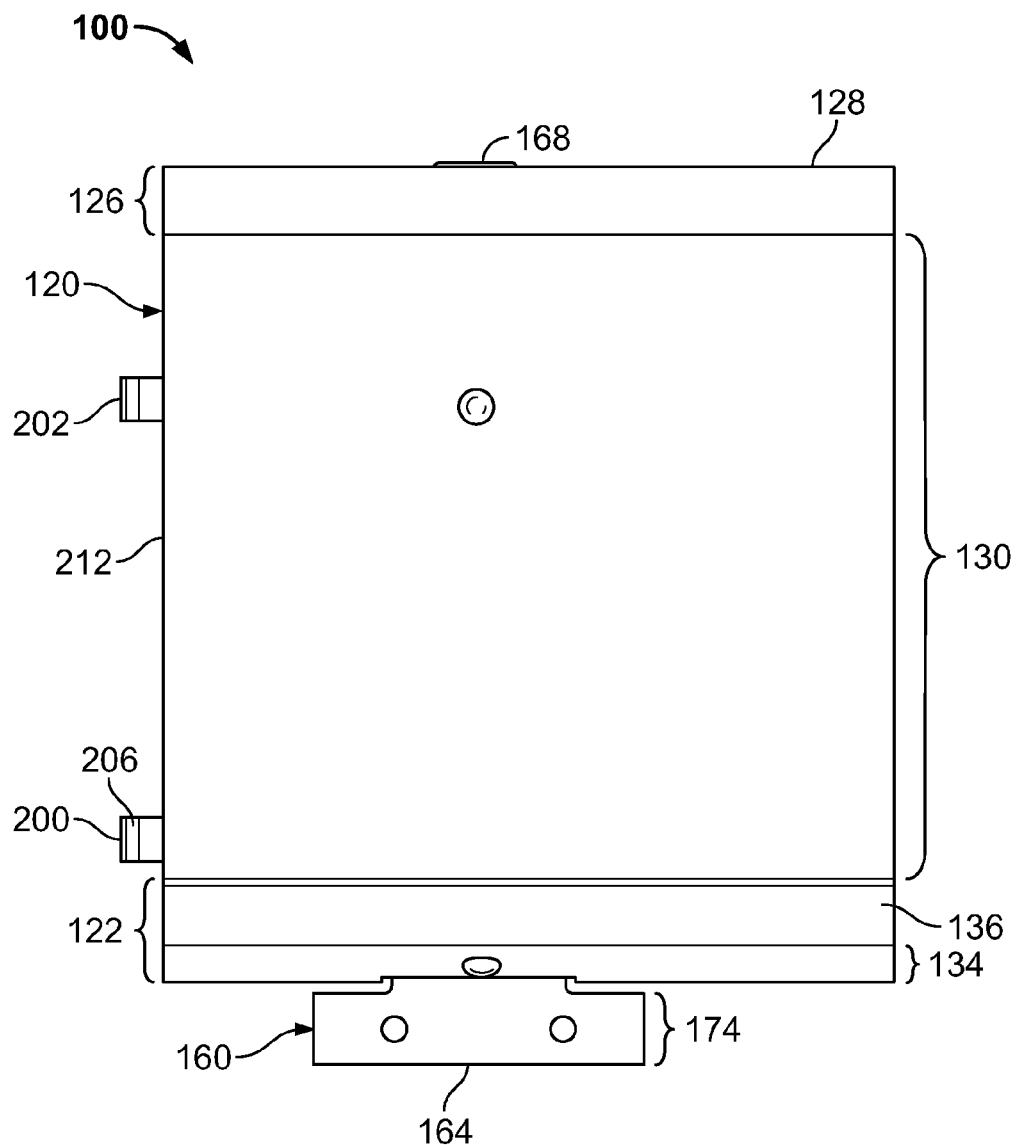
FIG. 7 is a top view of the exemplary embodiment of the floor module shown in FIG. 3.

As shown in FIGS. 6 and 7, the length 210 of second resilient projection 200 can be selected such that second resilient projection 200 projects beyond a side edge 212 of floor sheet 120 when floor sheet 120 and floor support 160 are assembled to yield floor module 100. In an alternate embodiment, second resilient projection 200 does not project beyond side edge 212. Referring still to FIGS. 6 and 7, the length 214 of third resilient projection 202 is selected such that third resilient projection 200 projects beyond side edge 212 when floor sheet 120 and floor support 160 are assembled to yield floor module 100. In an alternate embodiment, third resilient projection 202 does not project beyond side edge 212.

Figure 8:
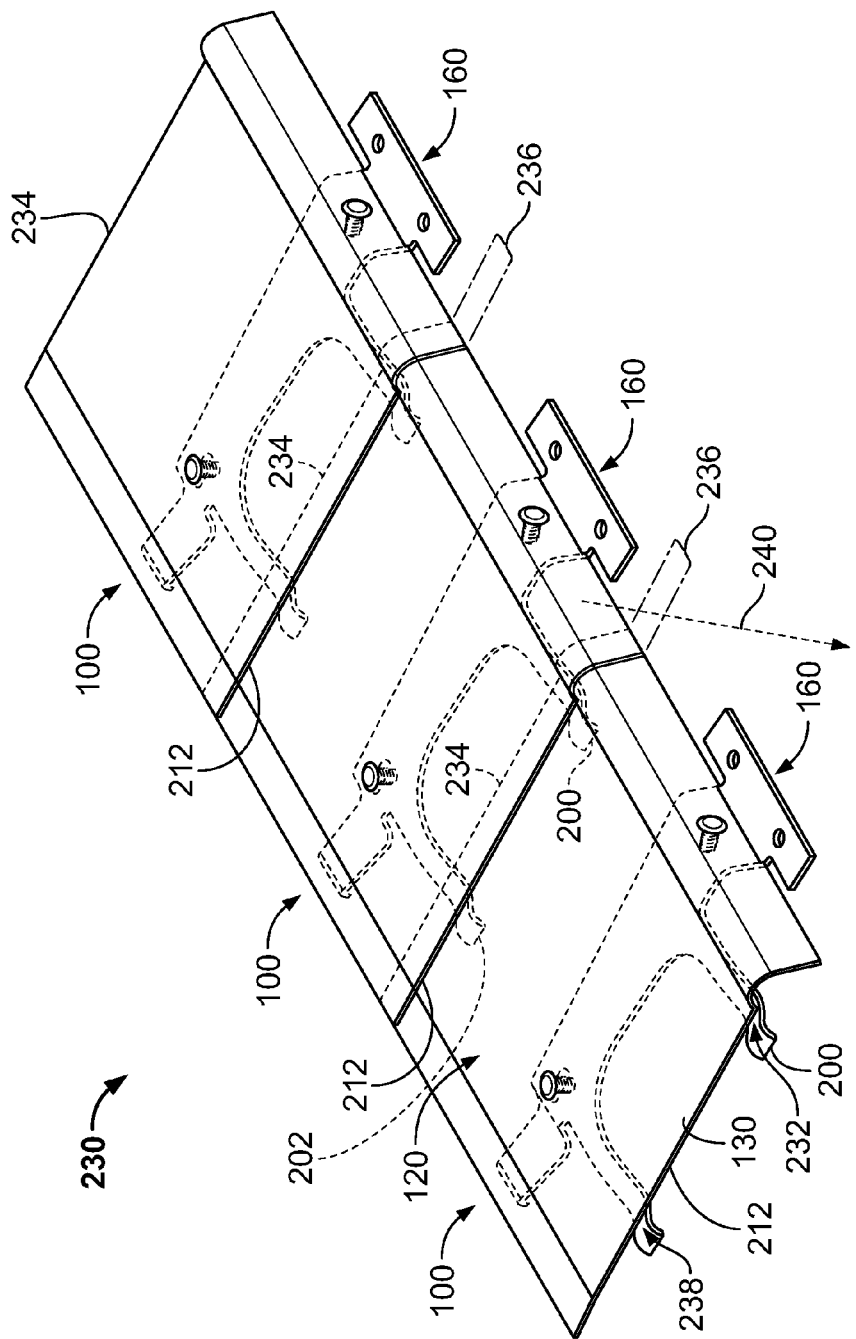
FIG. 8 is a front view, in perspective, showing an assembled array of three floor modules.

Referring to FIG. 8, which shows an array 230 of floor modules 100, when floor sheet 120 is properly secured to floor support 160, second resilient projection 200 (of floor support 160) and floor portion 130 (of floor sheet 120) define a first side slot 232 that is configured to receive therein a side edge 234 of a floor portion 130 of an adjacent floor module 100. This engagement between first side slot 232 and side edge 234 of an adjacent floor module 100 allows floor sheet 120 of (overlapping) floor module 100 to partially overlap a side edge portion 236 of floor sheet 120 of an (adjacent) floor module 100. Through this engagement, second resilient projection 200 also provides additional support for floor sheet 120 of the adjacent floor module 100. During operation of header 10, floor modules 100 will generally shift slightly or otherwise move somewhat relative to one another, and the partial overlap described above and shown in FIG. 8 advantageously prevents this movement from resulting in gaps between floor modules 100, which can disrupt the flow of plant material and/or result in loss of plant material. Also, the presence of multiple floor modules 100 arranged laterally in array 230 allows cutterbar 50 of header 10 to flex more easily, enhancing header performance on uneven terrain. Regarding maintenance, when a floor module 100 is damaged, a significant portion of header 10 does not have to be disassembled to effect a repair or replacement. Instead, the damaged floor module can be removed easily by first removing the two fasteners (e.g., bolts) that secure cutter bar attachment portion 174 to cutterbar 50 (see collectively FIGS. 3 and 5). These two fasteners pass through first cutter bar attachment aperture 178 and second cutter bar attachment aperture 180, respectively. Next, referring to FIG. 8 and assuming the middle floor module is the one that has been damaged, the middle floor module is shifted to the right (toward the floor module located on the right) until resilient projections 200, 202 of the middle floor module clear (overlapped) side edge 234 of the left floor module. Then, the center floor module is lifted by its left side (side edge 212) or a location proximate thereto, and pulled at an angle that is directed away from both the right floor module and away from the leading projection 196 (see FIG. 5) of the header frame 198. Arrow 240 of FIG. 8 represents the approximate direction of the pulling force. Please note that in alternate embodiments of the floor module where resilient projections 200, 202 both project in the opposite direction (i.e., both project toward the right, and not toward the left as shown in FIG. 8), the middle floor module would be shifted instead toward the left. Force arrow 240 would also be adjusted accordingly. Thus, it is not necessary to remove additional floor modules in order to remove or freely access the damaged floor module. Afterward, the replacement floor module or the repaired floor module can easily be inserted and secured in position by tightening or otherwise fastening the two fasteners that pass through first cutter bar attachment aperture 178 and second cutter bar attachment aperture 180, respectively. Such a repair or replacement can even be accomplished in the field by the operator, reducing interruption of harvesting operations.

Referring still to FIG. 8, the function of (optional) third resilient projection 202 is similar to that of second resilient projection 200. When floor sheet 120 is properly secured to floor support 160, third resilient projection 202 (of floor support 160) and floor portion 130 (of floor sheet 120) define a second side slot 238 that is also configured to receive therein side edge 234 of a floor portion 130 of an adjacent floor module 100. As in the engagement between first side slot 232 and side edge 234, the engagement between second side slot 238 and side edge 234 of an adjacent floor module 100 allows floor sheet 120 of floor module 100 to partially overlap a side edge portion 236 of floor sheet 120 of adjacent floor module 100. Second resilient projection 200 and third resilient projection 202, owing to their resilient nature, are preferably configured to apply a clamping-type force on floor portion 130 of adjacent floor module 100, which results in pressing the overlapped side edge portion 236 of floor portion 130 (of adjacent floor module 100) against the overlapping floor portion of the overlapping floor module 100.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A floor module comprising:
   a support comprising:
      a support leading edge portion comprising a cutter bar attachment portion configured for attachment to a cutter bar of a header, the cutter bar attachment portion terminating at a support leading edge;
      a support trailing edge portion comprising a first resilient projection, the first resilient projection terminating at a support trailing edge; and
      a floor support portion disposed between the support leading edge portion and the support trailing edge portion, the floor support portion comprising a second resilient projection that projects along an axis substantially parallel to an edge selected from the group consisting of the support leading edge and the support trailing edge; and
   a floor sheet overlaying the support, the floor sheet comprising:
      a floor sheet leading edge portion attached to the support leading edge portion;
      a floor sheet trailing edge portion; and
      a substantially planar floor portion disposed between the floor sheet leading edge portion and the floor sheet trailing edge portion, the substantially planar floor portion being attached to the floor support portion;
   wherein the first resilient projection and the floor sheet trailing edge portion define a trailing slot configured to receive a frame projection of a header; and
   wherein the second resilient projection and the substantially planar floor portion define a side slot configured to receive a side edge portion of a substantially planar floor portion of an adjacent floor module.

2. The floor module of claim 1, wherein the floor sheet trailing edge portion and the first resilient projection in combination function as a clip configured to releasably clip on to the frame projection of the header upon insertion of the frame projection into the trailing slot.

3. The floor module of claim 2, wherein the floor sheet trailing edge portion is angled toward the first resilient projection.

4. The floor module of claim 2, wherein the first resilient projection has an approximately S-shaped contour.

5. The floor module of claim 1, the floor sheet leading edge portion comprising a terminal portion and an elevated portion disposed between the terminal portion and the substantially planar floor portion, the terminal portion comprising a floor sheet leading edge, the elevated portion protruding away from the support.

6. The floor module of claim 5, wherein the angle between the terminal portion and the substantially planar floor portion is between approximately 90 degrees and approximately 125 degrees.

7. The floor module of claim 1, the support leading edge portion comprising a ramp portion joining the cutter bar attachment portion and the floor support portion, the ramp portion being angled away from the substantially planar floor portion of the floor sheet.

8. The floor module of claim 7, wherein the angle between the ramp portion and the floor support portion is between approximately 90 degrees and approximately 125 degrees.

9. The floor module of claim 1, wherein the second resilient projection has an approximately S-shaped contour.

10. The floor module of claim 1, the floor sheet further comprising a floor sheet side edge, and wherein the second resilient projection projects beyond the floor sheet side edge.

11. The floor module of claim 1,
the floor support portion comprising a first support aperture;
the support leading edge portion comprising a second support aperture;
the substantially planar floor portion comprising a first floor sheet aperture; and
the floor sheet leading edge portion comprising a second floor sheet aperture;
wherein the first support aperture, second support aperture, the first floor sheet aperture, and the second floor sheet aperture each are configured to facilitate attachment of the floor sheet to the support; and
wherein upon alignment of the first support aperture and the first floor sheet aperture and alignment of the second support aperture and the second floor sheet aperture, the trailing slot and the side slot are defined.

12. The floor module of claim 1, wherein the cutter bar attachment portion comprises a cutter bar aperture configured to facilitate attachment of the cutter bar attachment portion to the cutter bar of the header.

13. The floor module of claim 1,
the floor support portion further comprising a third resilient projection that projects along a second axis substantially parallel to an edge selected from the group consisting of the support leading edge and the support trailing edge;
wherein the third resilient projection and the substantially planar floor portion define a second side slot configured to receive the side edge portion of the substantially planar floor portion of the adjacent floor module.

14. An array of partially-overlapping floor modules, the array comprising:
a first floor module comprising:
a support comprising:
a support leading edge portion comprising a cutter bar attachment portion configured for attachment to a cutter bar of a header, the cutter bar attachment portion terminating at a support leading edge;
a support trailing edge portion comprising a first resilient projection, the first resilient projection terminating at a support trailing edge; and
a floor support portion disposed between the support leading edge portion and the support trailing edge portion, the floor support portion comprising a second resilient projection that projects along an axis substantially parallel to an edge selected from the group consisting of the support leading edge and the support trailing edge;
a floor sheet overlaying the support, the floor sheet comprising:
a floor sheet leading edge portion attached to the support leading edge portion;
a floor sheet trailing edge portion; and
a substantially planar floor portion disposed between the floor sheet leading edge portion and the floor sheet trailing edge portion, the substantially planar floor portion being attached to the floor support portion; and
an adjoining floor module comprising a side edge portion;
wherein the first resilient projection and the floor sheet trailing edge portion define a trailing slot configured to receive a frame projection of a header;
wherein the second resilient projection and the substantially planar floor portion define a side slot; and
wherein the side edge portion of the adjoining floor module is received in the side slot of the first floor module and is overlapped by the floor sheet of the first floor module.

15. The array of claim 14, the floor sheet of the first floor module further comprising a floor sheet side edge, and wherein the second resilient projection projects beyond the floor sheet side edge.

16. The array of claim 14, wherein the second resilient projection and the substantially planar floor portion in combination releasably clip on to the side edge portion of the adjoining floor module upon insertion of the side edge portion into the side slot.

17. The array of claim 14, wherein the adjoining floor module is substantially identical to the first floor module.

18. A header comprising:
a frame comprising a frame projection;
a cutter bar; and
a floor comprising an array of partially-overlapping floor modules, the array comprising:
a first floor module comprising:
a support comprising:
a support leading edge portion comprising a cutter bar attachment portion, the cutter bar attachment portion being attached to the cutter bar, the cutter bar attachment portion terminating at a support leading edge;
a support trailing edge portion comprising a first resilient projection, the first resilient projection terminating at a support trailing edge; and
a floor support portion disposed between the support leading edge portion and the support trailing edge portion, the floor support portion comprising a second resilient projection that projects along an axis substantially parallel to an edge selected from the group consisting of the support leading edge and the support trailing edge;
a floor sheet overlaying the support, the floor sheet comprising:
a floor sheet leading edge portion attached to the support leading edge portion;
a floor sheet trailing edge portion; and
a substantially planar floor portion disposed between the floor sheet leading edge portion and the floor sheet trailing edge portion, the substantially planar floor portion being attached to the floor support portion; and
an adjoining floor module comprising a side edge portion;
wherein the frame projection is received in a trailing slot defined by the first resilient projection and the floor sheet trailing edge portion; and
wherein the side edge portion of the adjoining floor module is received in a side slot defined by the second resilient projection and the substantially planar floor portion, the side edge portion being overlapped by the floor sheet of the first floor module.

19. The header of claim 18, wherein the floor sheet trailing edge portion and the first resilient projection in combination function as a clip that releasably retains the frame projection in the trailing slot.

20. The header of claim 18, wherein the second resilient projection and the substantially planar floor portion in combination function as a clip that releasably retains the side edge portion of the adjoining floor module in the side slot.

* * * * *